March 31, 1959　　　H. M. PASSMAN　　　2,879,673

DISENGAGEABLE SHAFT LOCKING MECHANISM

Filed April 3, 1953

INVENTOR.
HARRY M. PASSMAN
BY
　Marvin Moody
ATTORNEY

United States Patent Office 2,879,673
Patented Mar. 31, 1959

2,879,673

DISENGAGEABLE SHAFT LOCKING MECHANISM

Harry M. Passman, Cedar Rapids, Iowa, assignor to Collins Radio Company, Cedar Rapids, Iowa, a corporation of Iowa Application April 3, 1953, Serial No. 346,647

5 Claims. (Cl. 74—531)

This invention relates in general to locking means and in particular to a shaft locking means which may be quickly and easily detached.

It is oftentimes desirable to provide a locking means for a controlled shaft so that it will not drift or move due to vibration or accidental engagement after once set. For example, certain specifications require that a controlled shaft be locked without placing any torsion on the shaft which might have a tendency to rotate it. Also, in electronics it may be desirable to control a plurality of shafts from a front panel which may necessitate the control knobs being offset and a change in gear ratio between the control knobs and the control shaft.

It is an object of this invention, therefore, to provide a shaft locking means which will not place torsion on the shaft.

Another object of this invention is to provide a removable shaft transfer mechanism.

Still another object of the invention is to provide means for varying the gear ratio between a controlled shaft and a gear knob.

Figure 1:
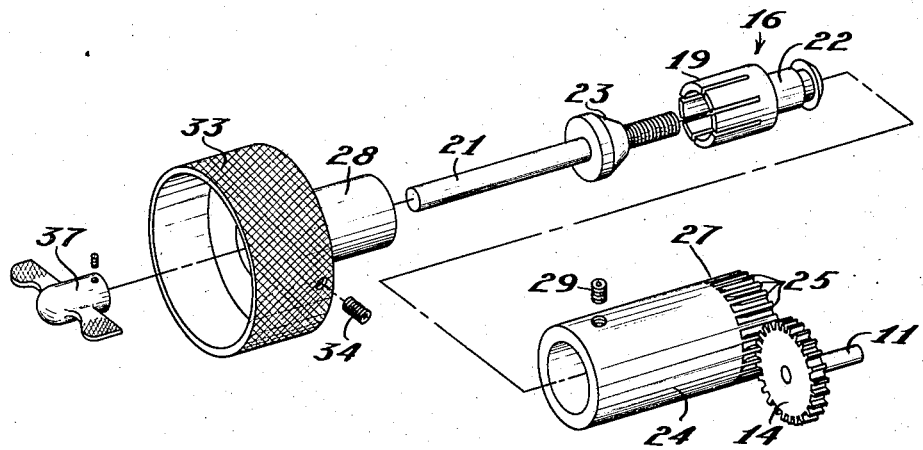
Figure 2:
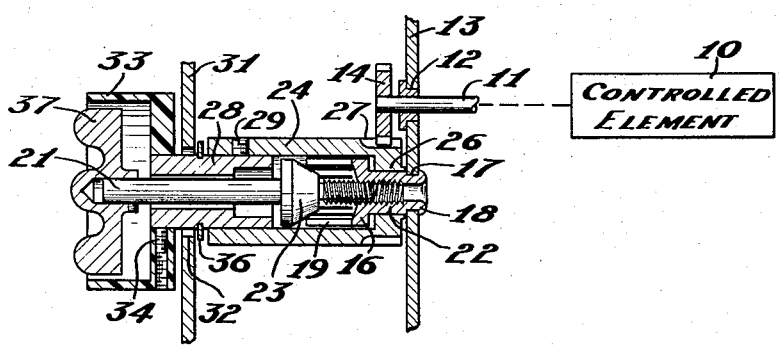

Further features, objects and advantages will become apparent from the following description and claims when read in view of the drawings, in which:

Figure 1 is an exploded view of the shaft locking mechanism of this invention; and Figure 2 is an assembled sectional view of the apparatus.

Figure 2 illustrates a controlled element 10 which might be, for example, a variable condenser that has a controlled shaft 11 connected thereto. The controlled shaft 11 is mounted by means of a suitable bearing 12 in a gear plate 13 which might, for example, be the chassis of a radio receiver.

A drive gear 14 is mounted on the end of shaft 11. A split stud 16 is fixedly mounted in the plate 13, as for example by passing it through an opening 17 in the plate and spinning an edge 18 over the other side of the plate. The stud 16 is nonrotatably supported by the plate 13. The stud has an enlarged hollow portion 19 which is formed with longitudinal slots so that a plurality of flexible fingers are formed. A locking shaft 21 is threadedly received in the portion 22 of the stud 16 and is formed with an enlarged tapered portion 23 which is engageable with the fingers 19 of the split stud.

A sleeve 24 is mounted concentric about the locking shaft 21 and has a portion 26 which rests on the split stud so that it may be rotatably supported thereby. The end 27 of the sleeve 24 is formed with gear teeth 25 so as to drive the shaft 11 when rotation of the sleeve 24 occurs. A knob shaft 28 is mounted concentric about the locking shaft 21 and may be locked to the sleeve 24 by means of a set screw 29.

The knob shaft passes through a front panel 31 which is formed with an opening 32. A hollow knob 33 is detachably connected to the knob shaft 28 by means of a set screw 34. A locking ring 36, as for example a Truarc, is mounted in a groove formed in the knob shaft 28 adjacent the plate 31. The locking shaft 21 passes through the knob shaft 28 and the knob 33 and a locking wing nut 37 is attached to its outer end.

The structure thus described allows the shaft 11 to be locked without rotating it, in that the locking mechanism does not produce a rotary component in the locking action.

In operation, suppose that it is desired to adjust the controlled element 10 to a new position and lock it so that it will not be accidentally rotated by vibration or other means. The locking wing nut 37 is unscrewed so as to move the camming portion 23 out of engagement with the flexible fingers 19 of the split stud which removes bearing stress between the locking stud fingers 19 and the internal portion of the sleeve 24. When this bearing stress has been removed, the knob 33 may be rotated freely through the knob shaft 28 and sleeve 24 to drive the controlled shaft 11 by means of the gear 14. Once the new position is obtained, the wing nut 37 is tightened so as to move the camming portion 23 to the right relative to Figure 2, thereby forcing the flexible portions 19 outwardly against the sleeve 24. This locks the sleeve 24 to the split stud 16 and prevents it from rotating relative to the plate 13 for the reason that the split stud is firmly and nonrotatably attached thereto.

It is to be realized also that in the event that it is desired to disassemble the apparatus so that the plate 13 may be removed from the plate 31, this may be accomplished by unscrewing the lock shaft 21 so that it disengages the split stud and by removing the set screw 29 so as to allow sliding motion between the sleeve 24 and the knob shaft 28. The apparatus may be quickly and easily reassembled by threading the lock shaft into the split stud and by resetting the set screw 29.

It is seen that this invention provides a simple and positive locking means which may be used to increase or decrease the gear ratio between a knob shaft and a controlled shaft.

Although it has been described with respect to preferred embodiments thereof, it is not to be so limited as changes and modifications may be made therein which are within the full intended scope of the invention as defined by the appended claims.

I claim:

1. A shaft locking mechanism comprising, a gear plate, a controlled shaft rotatably supported in said gear plate, a drive gear mounted on said controlled shaft, a split stud nonrotatably supported by said gear plate, a sleeve rotatably supported by the split stud and formed with a plurality of gear teeth at one end thereof which are engageable with said drive gear, a knob shaft received concentrically within said sleeve, locking means for locking said sleeve to said knob shaft, a locking shaft passing concentrically through said knob shaft and threadedly received in said split stud, and an enlarged tapered portion mounted on said locking shaft and engageable with said split stud to force it against said sleeve.

2. Means for locking a shaft without placing torsion thereon comprising, a plate, a controlled shaft rotatably supported by said plate, a drive gear attached to said controlled shaft, a split stud connected to said plate and formed with a threaded axial opening, a locking shaft threadedly received in said split stud, a tapered portion mounted on said locking shaft and engageable with said split stud, a sleeve formed with gear teeth at one end which are engageable with said drive gear and rotatably supported by said split stud, a knob shaft concentric about said locking shaft and received within said sleeve to be locked thereto, and a wing nut connected to said locking shaft for locking and unlocking said sleeve to the split stud.

3. Means for locking a shaft without placing torsion thereon comprising, a plate, a controlled shaft rotatably supported by said plate, a drive gear attached to said controlled shaft, a split stud connected to said plate and formed with a threaded axial opening, a locking shaft threadedly received in said split stud, a tapered portion mounted on said locking shaft and engageable with said split stud, a sleeve formed with gear teeth at one end which are engageable with said drive gear and rotatably supported by said split stud, a knob shaft concentric about said locking shaft and received within said sleeve to be locked thereto, a hollow knob mounted to said knob shaft, and a wing nut connected to said locking shaft for locking and unlocking said sleeve to the split stud.

4. Means for locking a shaft without placing torsion thereon comprising, a plate, a controlled shaft rotatably supported by said plate, a drive gear attached to said controlled shaft, a split stud connected to said plate and formed with a threaded axial opening and with a plurality of flexible fingers at one end thereof, a locking shaft threadedly received in said split stud, a tapered portion mounted on said locking shaft and engageable with said flexible fingers, a sleeve formed with gear teeth at one end which are engageable with said drive gear and rotatably supported by said split stud, a knob shaft concentric about said locking shaft and received within said sleeve to be locked thereto, and a wing nut connected to said locking shaft for locking and unlocking said sleeve to the split stud.

5. Means for locking a shaft without placing torsion thereon comprising, a plate, a controlled shaft rotatably supported by said plate, a drive gear attached to said controlled shaft, a split stud connected to said plate and formed with a threaded axial opening, a locking shaft threadedly received in said split stud, a tapered portion mounted on said locking shaft and engageable with said split stud, a sleeve formed with gear teeth at one end which are engageable with said drive gear and formed with a necked-down portion which is engageable with a bearing surface on said split stud, a knob shaft concentric about said locking shaft and received within said sleeve to be locked thereto, and a wing nut connected to said locking shaft for locking and unlocking said sleeve to the split stud.

References Cited in the file of this patent

UNITED STATES PATENTS

| | | |
|---|---|---|
| 2,047,219 | Meyer | July 14, 1936 |
| 2,498,835 | Brotman | Feb. 28, 1950 |
| 2,643,632 | Signon | June 30, 1950 |

FOREIGN PATENTS

| | | |
|---|---|---|
| 604,493 | France | Jan. 29, 1926 |
| 884,159 | France | Apr. 12, 1943 |